D. B. D. SMELTZER.
CORN-COVERER AND MARKER.
No. 174,020. Patented Feb. 22, 1876.
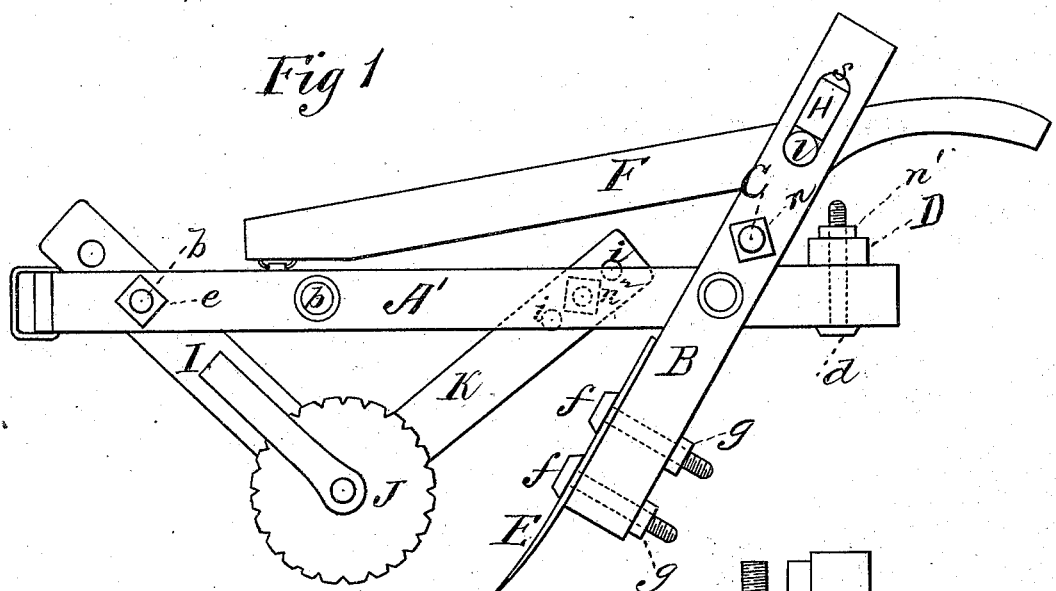
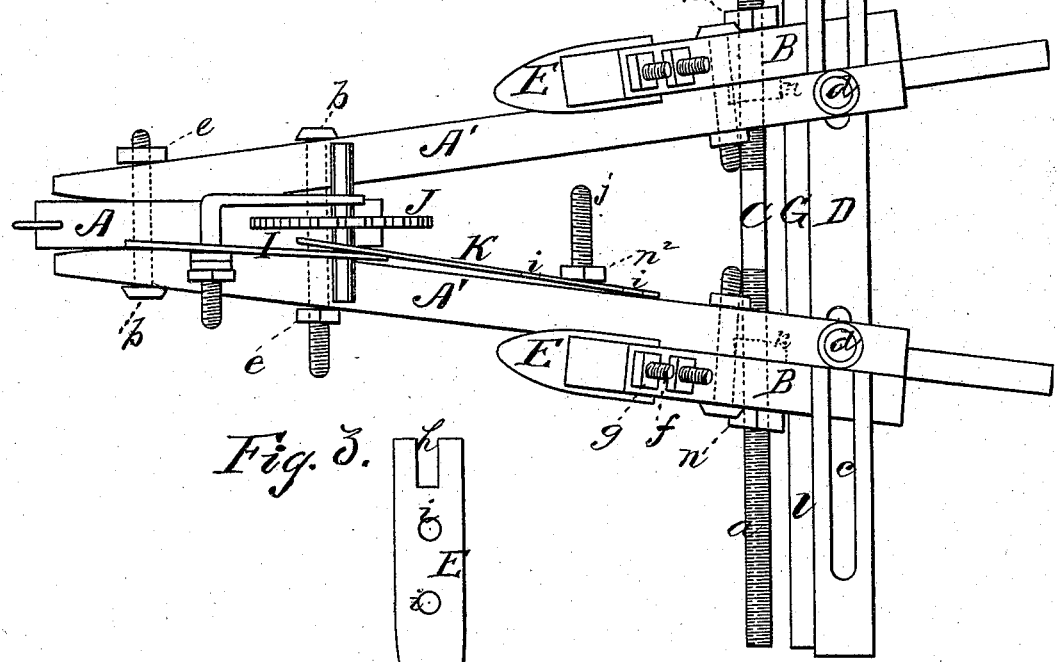
WITNESSES
Mary F. Utley,
Emory H. Bates
INVENTOR
Daniel B. D. Smeltzer
Chipman, Hosmer & Co.
ATTORNEYS

UNITED STATES PATENT OFFICE.

DANIEL B. D. SMELTZER, OF MIDDLETOWN, MARYLAND.

IMPROVEMENT IN CORN COVERERS AND MARKERS.

Specification forming part of Letters Patent No. 174,020, dated February 22, 1876; application filed January 8, 1876.

*To all whom it may concern:*

Be it known that I, DANIEL B. D. SMELTZER, of Middletown, in the county of Frederick and State of Maryland, have invented a new and valuable Improvement in Corn Coverer and Marker; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my corn coverer and marker; and Fig. 2 is a plan view of the same. Fig. 3 is a detail view thereof.

This invention has relation to improvements in corn coverers and markers; and it consists in the arrangement and novel construction of the various devices employed, whereby very useful and reliable results are obtained, as will be hereinafter more fully set forth and claimed.

In the annexed drawings, the letter A designates a clevis-block, preferably of wood, to which the wooden beams A' of my improved implement are secured. These beams diverge outwardly, and are bolted near their rear ends to coverer-standards B, which are connected above the beams by means of a strong metallic rod, C. This rod is provided at each end with a screw-threaded portion, $a$, and at each side of standards B upon the said rod with a nut, $n$, the object of which will hereinafter appear, and beams A' are adjustably braced by means of a bar, D, which is provided at each end with a slot, $c$, and is secured to the said beams by means of bolts $d$, which pass upward through the beams and the slots, and are made to hold by means of a jaw-nut, $n^1$, applied upon its upper projecting screw-threaded end, as shown in Fig. 1. Beams B are confined to the clevis-block A by means of two bolts, $b$, and nuts $e$, the said bolts projecting considerably, so that by unscrewing the said nuts, the extreme front of the said beams in contact with the block being rounded, the rear ends of beams B may be separated by loosening nut $n^1$ on bolts $d$, and nuts $n$ on rod C, and then drawing the said beams outward from each other. The effect of this will be to increase the distance between the shovels or coverers E, the construction of which will hereinafter appear; but if the beams be approximated the shovels will be brought closer together. The desired adjustment being obtained, nuts $n$ $n^1$ are then set up forcibly, thus maintaining the requisite distance between the coverers while passing over the ground. Coverers E are of the usual form, and are secured to the standards by means of two bolts, $f$, and nuts $g$, which pass through apertures $i$ formed therein, and they are provided with a vertical cleft, $h$. The object of this cleft is that when the coverers are detached from the standards, and then reapplied, so as to penetrate deeper into the ground, the upper bolt will, in lieu of passing through a hole, be received in the cleft, while the lower bolt will enter and extend through the upper hole in the the coverer, the effect of which will be that the upper hole in the standard will register with some part of the cleft, whereas if a hole were substituted for the cleft the necessary registration would, perhaps, not obtain. F represents the usual well-known plow-handles, which are hinged at their front ends to beams A', and extend to the rear between the upward extensions of standards B. These handles are connected by means of a brace, G, the cylindrical ends $l$ of which pass through slots $s$ cut in the said standards, as shown in Fig. 1. The handles being hinged to the beams, and the ends of their brace G being engaged in slots $s$, which will be slightly curved, they are capable of being adjusted to suit a tall or a short man, and are maintained at this adjustment by means of wedge-blocks H, which are inserted in slots $s$ above or below the cylindric ends $l$ of the brace, as the case may be. The ends $l$, as shown in Fig. 2, extend considerably beyond the standards, and will consequently in no way interfere with the outward adjustment of the standards, while at the same time they add considerably to their rigidity and their power of resisting strain.

In practice I shall use a serrated wheel-colter, J, having its bearings in a vertically vibrating and adjustable hanger, I, which wheel is raised or lowered by means of a rod, K, secured to one of the beams A' by means of a bolt, $j$, which passes through one of several apertures, $i$, in the upper end of the said rod, and is clamped to the beam by setting up a nut, $n^2$. By drawing wheel J to the rear, nut $n^2$ being loosened, the said wheel will be raised, and by thursting it to the front it will be lowered, either of these adjustments being maintained by setting up nut $n^2$.

What I claim as new, and desire to secure by Letters Patent, is—

In combination with the laterally-extensible beams A' and the upwardly-extended standards B, the extension-rod C, having screw-threads $a$, nuts $n$, the bar D, having slots $c$, and clamp-bolts $d$, substantially as specified.

In testimony that I claim the above I have hereunto subscribed my name in the presence of two witnesses.

DANIEL B. D. SMELTZER.

Witnesses:
 WALTER C. MASI,
 GEORGE E. UPHAM.